(12) United States Patent
Siegel

(10) Patent No.: US 10,040,314 B2
(45) Date of Patent: Aug. 7, 2018

(54) NON-PNEUMATIC TIRE

(71) Applicant: THE GOODYEAR TIRE & RUBBER COMPANY, Akron, OH (US)

(72) Inventor: Addison Brian Siegel, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 172 days.

(21) Appl. No.: 14/960,928

(22) Filed: Dec. 7, 2015

(65) Prior Publication Data
US 2017/0157983 A1 Jun. 8, 2017

(51) Int. Cl.
| | |
|---|---|
| *B60B 9/26* | (2006.01) |
| *B60B 9/12* | (2006.01) |
| *B60C 7/14* | (2006.01) |
| *B60C 7/08* | (2006.01) |
| *B60C 7/12* | (2006.01) |
| *B60C 7/18* | (2006.01) |

(52) U.S. Cl.
CPC .................. *B60B 9/26* (2013.01); *B60B 9/12* (2013.01); *B60C 7/08* (2013.01); *B60C 7/12* (2013.01); *B60C 7/14* (2013.01); *B60C 7/18* (2013.01); *B60B 2900/115* (2013.01); *B60C 2007/146* (2013.01)

(58) Field of Classification Search
CPC .... B60B 9/00; B60B 9/02; B60B 9/04; B60B 9/10; B60B 9/12; B60B 9/26; B60C 7/00; B60C 7/10; B60C 7/102; B60C 7/14; B60C 2007/107; B60C 2007/146
See application file for complete search history.

(56) References Cited

U.S. PATENT DOCUMENTS

| | | | |
|---|---|---|---|
| 4,235,270 A | * | 11/1980 | Kahaner .................. B60B 9/12 152/326 |
| 4,280,736 A | | 7/1981 | Raudman |
| 6,170,544 B1 | | 1/2001 | Hottebart |
| 6,681,822 B2 | | 1/2004 | Adams et al. |
| 6,726,292 B1 | | 4/2004 | Schroeder et al. |
| 7,950,428 B2 | | 5/2011 | Hanada et al. |
| 8,276,628 B2 | | 10/2012 | Hanada et al. |
| 8,491,981 B2 | | 7/2013 | Delfino et al. |
| 8,883,283 B2 | | 11/2014 | Delfino et al. |
| 8,999,480 B2 | | 4/2015 | Summers et al. |
| 2002/0096237 A1 | | 7/2002 | Burhoe et al. |

(Continued)

FOREIGN PATENT DOCUMENTS

| | | |
|---|---|---|
| EP | 3144159 A1 | 3/2017 |
| JP | 2015113080 A | 6/2015 |

(Continued)

OTHER PUBLICATIONS

European Search Report dated Mar. 31, 2017 for Application Serial No. EP16199939.

*Primary Examiner* — Jason R Bellinger
(74) *Attorney, Agent, or Firm* — June E. Rickey

(57) ABSTRACT

A structurally supported tire includes a ground contacting annular tread portion; a shear band, and a connected spoke disk connected to the shear band. The connected spoke disk has two or more circumferential spokes joined together by a connecting web, wherein the spring rate of the connected spoke disk is greater than the spring rate of the shear band.

23 Claims, 11 Drawing Sheets

(56) References Cited

U.S. PATENT DOCUMENTS

| | | | |
|---|---|---|---|
| 2006/0144488 A1* | 7/2006 | Vannan | B60O 7/10 |
| | | | 152/7 |
| 2008/0053586 A1 | 3/2008 | Hanada et al. | |
| 2009/0211674 A1 | 8/2009 | Hanada et al. | |
| 2009/0211677 A1* | 8/2009 | Palinkas | B60O 7/102 |
| | | | 152/209.1 |
| 2009/0283185 A1 | 11/2009 | Manesh et al. | |
| 2009/0294000 A1 | 12/2009 | Cron | |
| 2010/0193097 A1 | 8/2010 | McNier et al. | |
| 2010/0307653 A1 | 12/2010 | Delfino et al. | |
| 2011/0011506 A1 | 1/2011 | Manesh et al. | |
| 2011/0024008 A1 | 2/2011 | Manesh et al. | |
| 2011/0079335 A1 | 4/2011 | Manesh et al. | |
| 2011/0108173 A1 | 5/2011 | Abe | |
| 2011/0260525 A1 | 10/2011 | Delfino | |
| 2011/0290394 A1* | 12/2011 | Luchini | B60O 7/10 |
| | | | 152/302 |
| 2012/0067481 A1 | 3/2012 | Cron | |
| 2012/0193004 A1 | 8/2012 | Anderson et al. | |
| 2015/0174954 A1 | 6/2015 | Asper | |
| 2017/0080756 A1 | 3/2017 | Van Riper et al. | |

FOREIGN PATENT DOCUMENTS

| | | |
|---|---|---|
| JP | 2015151009 A | 8/2015 |
| WO | 199702960 A1 | 1/1997 |
| WO | 2003018332 A1 | 3/2003 |

* cited by examiner

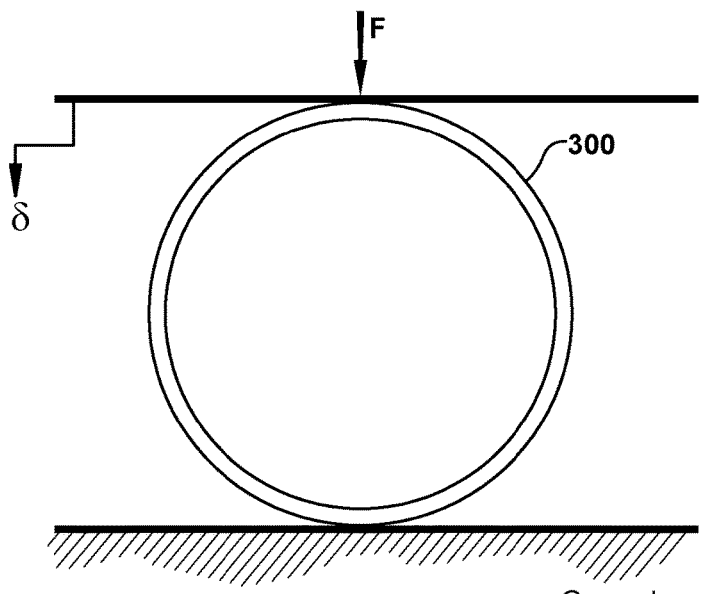
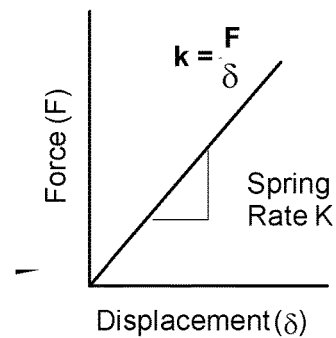
Fig. 9B
Fig. 9A
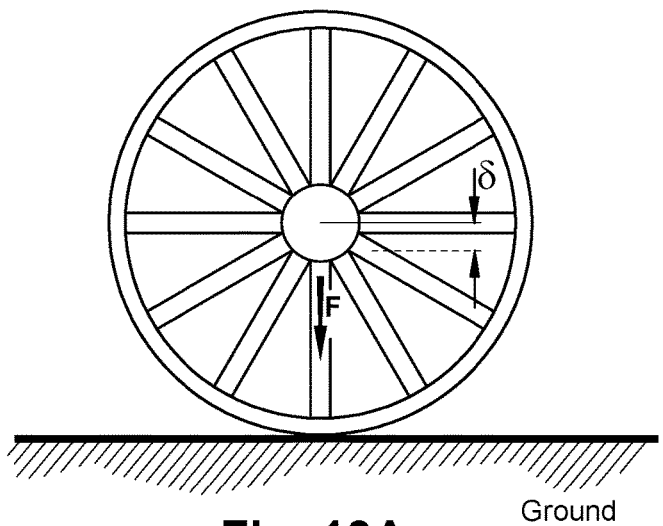
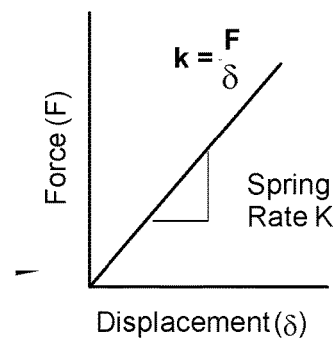
Fig. 10B
Fig. 10A

Planar Tension Test Specimen Outline

NON-PNEUMATIC TIRE

FIELD OF THE INVENTION

The present invention relates generally to vehicle tires and non-pneumatic tires, and more particularly, to a non-pneumatic tire.

BACKGROUND OF THE INVENTION

The pneumatic tire has been the solution of choice for vehicular mobility for over a century. The pneumatic tire is a tensile structure. The pneumatic tire has at least four characteristics that make the pneumatic tire so dominate today. Pneumatic tires are efficient at carrying loads, because all of the tire structure is involved in carrying the load. Pneumatic tires are also desirable because they have low contact pressure, resulting in lower wear on roads due to the distribution of the load of the vehicle. Pneumatic tires also have low stiffness, which ensures a comfortable ride in a vehicle. The primary drawback to a pneumatic tire is that it requires compressed fluid. A conventional pneumatic tire is rendered useless after a complete loss of inflation pressure.

A tire designed to operate without inflation pressure may eliminate many of the problems and compromises associated with a pneumatic tire. Neither pressure maintenance nor pressure monitoring is required. Structurally supported tires such as solid tires or other elastomeric structures to date have not provided the levels of performance required from a conventional pneumatic tire. A structurally supported tire solution that delivers pneumatic tire-like performance would be a desirous improvement.

Non pneumatic tires are typically defined by their load carrying efficiency. "Bottom loaders" are essentially rigid structures that carry a majority of the load in the portion of the structure below the hub. "Top loaders" are designed so that all of the structure is involved in carrying the load. Top loaders thus have a higher load carrying efficiency than bottom loaders, allowing a design that has less mass.

Thus an improved non pneumatic tire is desired that has all the features of the pneumatic tires without the drawback of the need for air inflation is desired.

BRIEF DESCRIPTION OF THE DRAWINGS

The present invention will be better understood through reference to the following description and the appended drawings, in which:

FIG. 9a illustrates a spring rate test for a shear band or spoke disk, while FIG. 9b illustrates the spring rate k determined from the slope of the force displacement curve.

FIG. 10a illustrates a spring rate test for the tire, while FIG. 10b illustrates the spring rate k determined from the slope of the force F vs displacement $\delta$ curve.

DEFINITIONS

The following terms are defined as follows for this description.

"Equatorial Plane" means a plane perpendicular to the axis of rotation of the tire passing through the centerline of the tire.

"Meridian Plane" means a plane parallel to the axis of rotation of the tire and extending radially outward from said axis.

"Hysteresis" means the dynamic loss tangent measured at 10 percent dynamic shear strain and at 25° C.

DETAILED DESCRIPTION OF THE INVENTION

Figure 1:
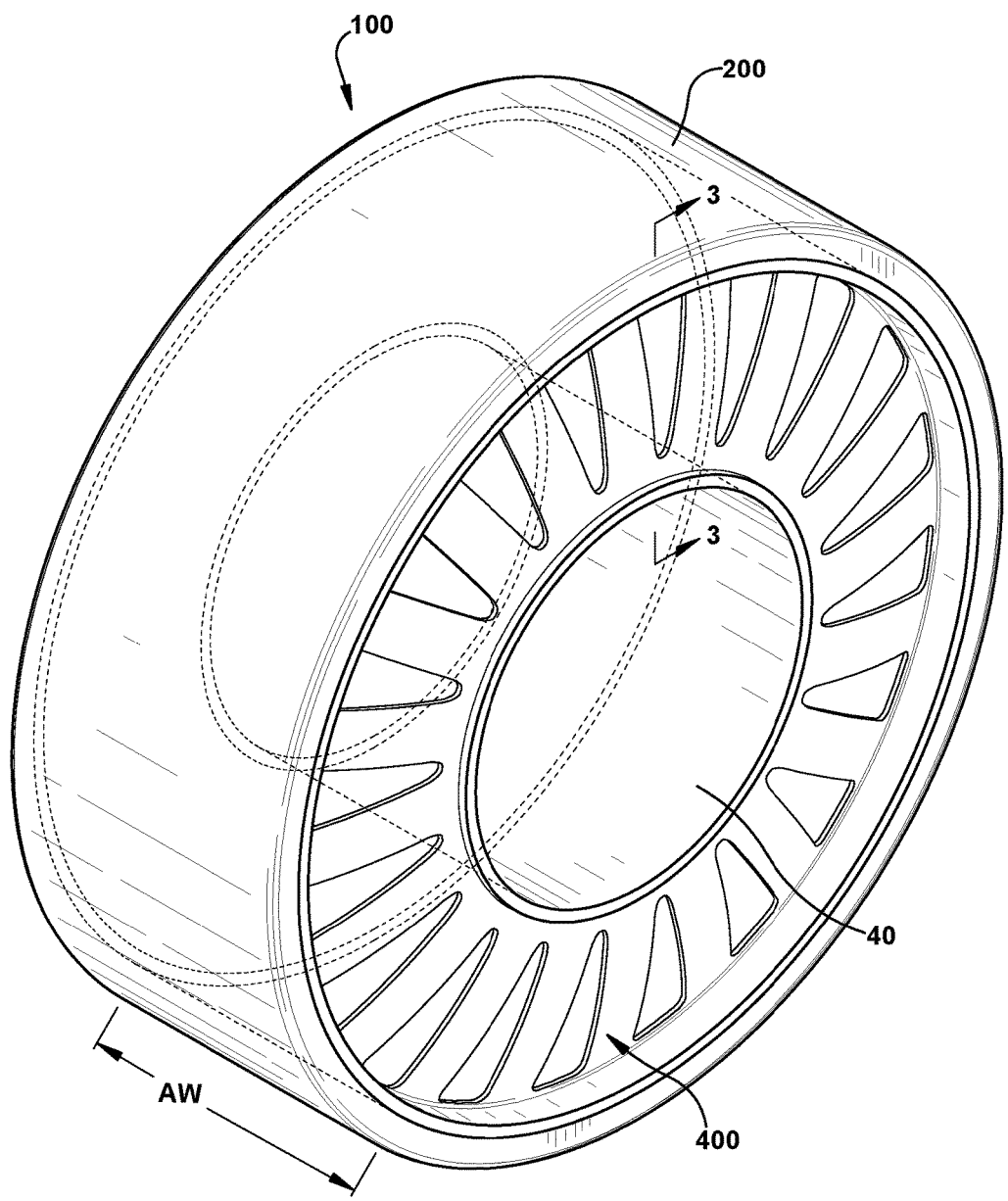
FIG. 1 is a perspective view of a first embodiment of a non-pneumatic tire of the present invention.

The non-pneumatic tire 100 of the present invention is shown in FIG. 1. The tire of the present invention includes a radially outer ground engaging tread 200, a shear band 300, and a spoke disk 400. The non-pneumatic tire of the present invention is designed to be a top loading structure, so that the shear band 300 and the connected spoke disks 400 efficiently carry the load. The shear band 300 and the connected spoke disks 400 are designed so that the stiffness of the shear band is directly related to the spring rate of the tire. The spoke disk is designed to be a stiff structure that buckles or deforms in the tire footprint and does not compress or carry a compressive load. This allows the rest of the spokes not in the footprint area the ability to carry the load. Since there are more spokes outside of the footprint than in, the load per spoke would be small, enabling smaller spokes to carry the tire load, resulting in a very load efficient structure. Not all spokes will be able to elastically buckle and will retain some portion of the load in compression in the footprint. It is desired to minimize this load for the reason above and to allow the shearband to bend to overcome road obstacles. The approximate load distribution is such that approximately 90-100% of the load is carried by the shear band and the upper spokes, so that the lower spokes carry virtually zero of the load, and preferably less than 10%.

The tread portion 200 may have no grooves or may have a plurality of longitudinally oriented tread grooves forming essentially longitudinal tread ribs there between. Ribs may be further divided transversely or longitudinally to form a tread pattern adapted to the usage requirements of the particular vehicle application. Tread grooves may have any depth consistent with the intended use of the tire. The tire tread 200 may include elements such as ribs, blocks, lugs, grooves, and sipes as desired to improve the performance of the tire in various conditions.

Shear Band

Figure 3:
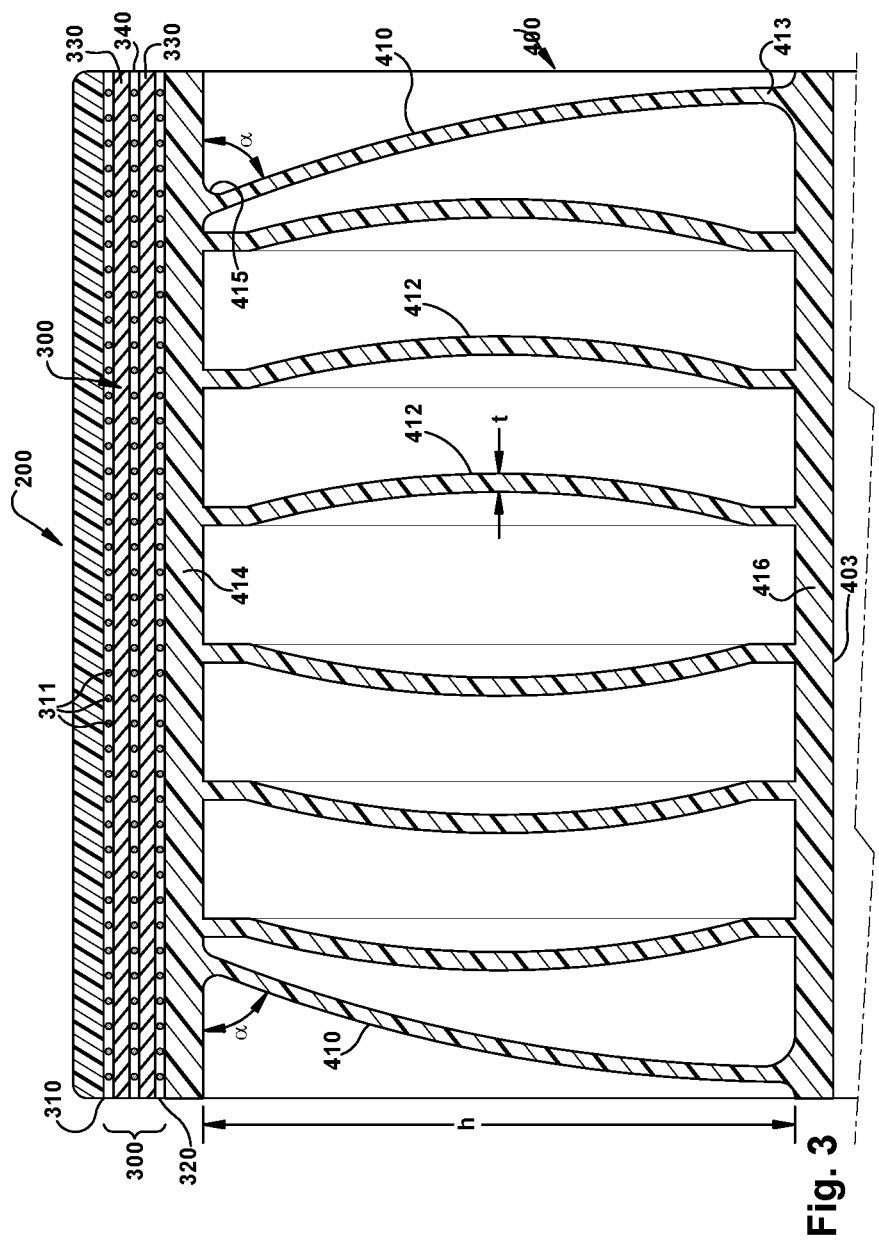
FIG. 3 is a cross-sectional view of the connected spoke disk of FIG. 1 in the direction 3-3.

The shear band 300 is preferably annular, and is shown in FIG. 3. The shear band 300 is located radially inward of the tire tread 200. The shear band 300 includes a first and second reinforced elastomer layer 310,320. In a first embodiment of a shear band 300, the shear band is comprised of two inextensible reinforcement layers 310,320 arranged in parallel, and separated by a shear matrix 330 of elastomer. Each inextensible layer 310,320 may be formed of parallel inextensible reinforcement cords 311,321 embedded in an elastomeric coating. The reinforcement cords 311,321 may be steel, aramid, nylon, polyester or other inextensible structure. The shear band 300 may further optionally include a third reinforced elastomer layer 340 located between the first and second reinforced elastomer layers 310,320.

In the first reinforced elastomer layer 310, the reinforcement cords 311 are oriented at an angle Φ in the range of 0 to about +/−10 degrees relative to the tire equatorial plane. In the second reinforced elastomer layer 320, the reinforcement cords 321 are oriented at an angle φ in the range of 0 to about +/−10 degrees relative to the tire equatorial plane. Preferably, the angle Φ of the first layer is in the opposite direction of the angle φ of the reinforcement cords in the second layer. That is, an angle +Φ in the first reinforced elastomeric layer and an angle −φ in the second reinforced elastomeric layer.

The shear matrix 330 has a radial thickness in the range of about 0.10 inches to about 0.2 inches, more preferably about 0.15 inches. The shear matrix is preferably formed of an elastomer material having a shear modulus Gm in the range of 2.5 to 40 MPa, and more preferably in the range of 20 to 40 MPA.

Figure 12:
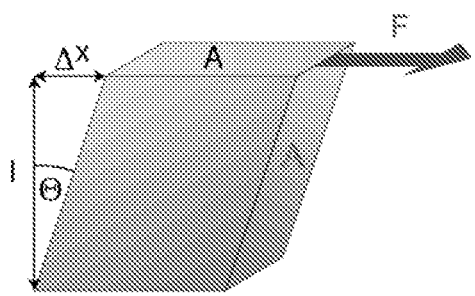
FIG. 12 illustrates the shear force F, $\Delta X$, L in order to calculate shear stiffness GA on a test specimen.

The shear band has a shear stiffness GA. The shear stiffness GA may be determined by measuring the deflection on a representative test specimen taken from the shear band. The upper surface of the test specimen is subjected to a lateral force F as shown in FIG. 12. The shear stiffness GA is then calculated from the following equation:

$$GA = F*L/\Delta X$$

The shear band has a bending stiffness EI. The bending stiffiiess EI may be determined from beam mechanics using the three point bending test subjected to a test specimen representative of the shear band. It represents the case of a beam resting on two roller supports and subjected to a concentrated load applied in the middle of the beam. The bending stiffness EI is determined from the following equation: $EI = PC/48*\Delta X$, where P is the load, L is the beam length, and ΔX is the deflection.

It is desirable to maximize the bending stiffness of the shearband EI and minimize the shear band stiffness GA. The acceptable ratio of GA/EI would be between 0.01 and 20, with a preferred range between 0.01 and 5. EA is the extensible stiffness of the shear band, and it is determined experimentally by applying a tensile force and measuring the change in length. The ratio of the EA to EI of the shearband is acceptable in the range of 0.02 to 100 with a preferred range of 1 to 50.

The shear band 300 has a spring rate k that may be determined experimentally by exerting a downward force on a horizontal plate at the top of the shear band and measuring the amount of deflection as shown in FIG. 9a. The spring rate k is determined from the slope of the Force versus deflection curve, as shown in FIG. 9b.

The invention is not limited to the shear band structure disclosed herein, and may comprise any structure which has a GA/EI in the range of 0.01 to 20, or a EA/EI ratio in the range of 0.02 to 100, or a spring rate in the range of 20 to 2000, as well as any combinations thereof. More preferably, the shear band has a GA/EI ratio of 0.01 to 5, or an EA/EI ratio of 1 to 50, or a spring rate of 170 lb/in, and any subcombinations thereof. The tire tread is preferably wrapped about the shear band and is preferably integrally molded to the shear band.

Connected Spoke Disk

Figure 4:
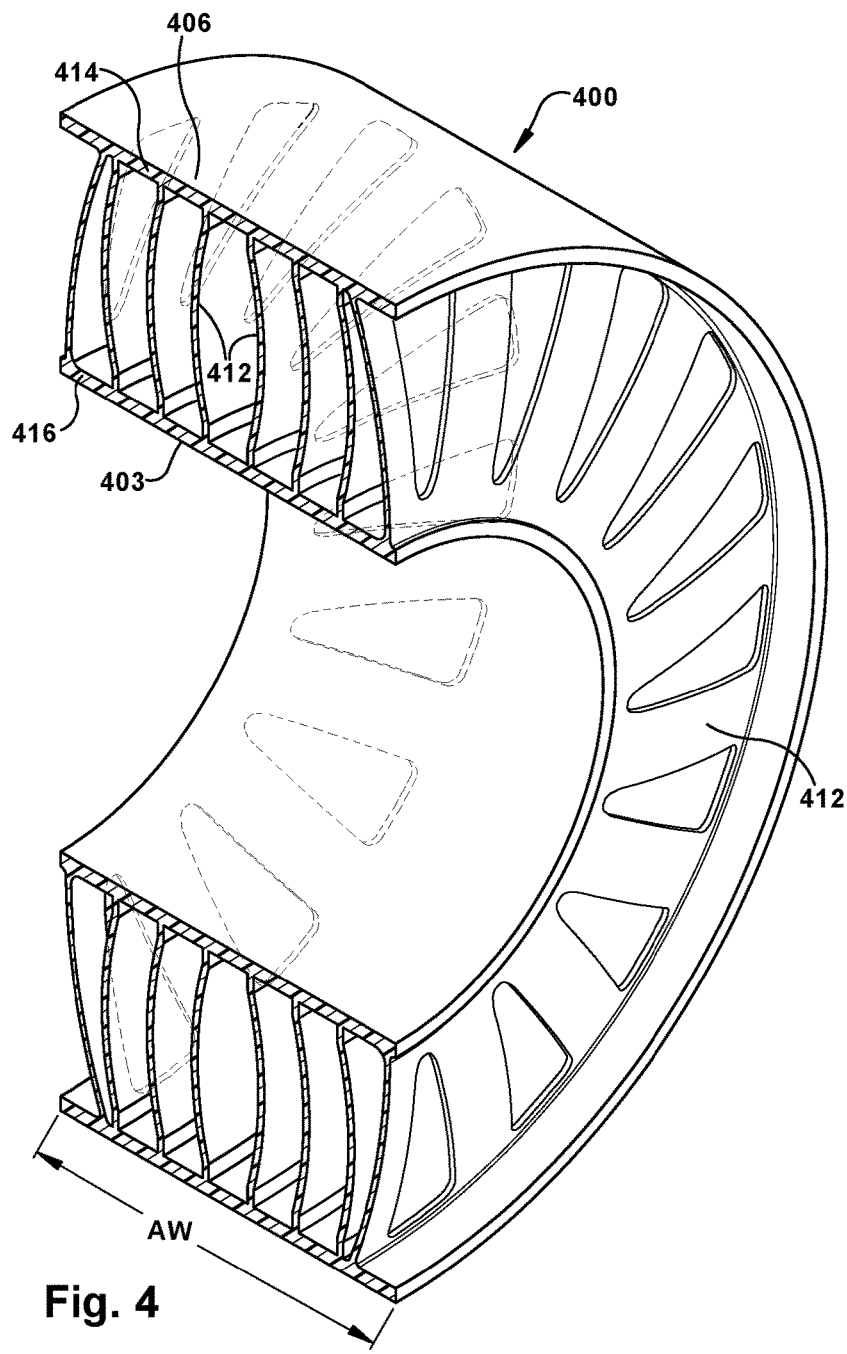
FIG. 4 is a perspective cross-sectional view of only the spoke disk of FIG. 2.

The non-pneumatic tire of the present invention further includes one connected spoke disk 400 as shown in FIGS. 1-5. The connected spoke disk 400 functions to carry the load transmitted from the shear layer. The connected spoke disk is primarily loaded in tension and shear, and carries no load in compression. As shown in FIG. 4, the connected spoke disk 400 is annular, and has an outer radial edge 406 and an inner radial edge 403 for receiving a metal or rigid reinforcement ring 405 to form a hub. The connected spoke disk 400 has an axial thickness AW that preferably has the same width as the non-pneumatic tire. Each spoke disk 400 has two or more circumferential spokes 412. The circumferential spokes 412 are joined together at its outer radius by an upper connecting web 414. The circumferential spokes 412 are joined together at its inner radius by a lower connecting web 416. Each circumferential spoke 412 has an axial thickness t substantially less than the axial thickness AW of the non-pneumatic tire. The axial thickness t is described in more detail, below.

Then connected spoke disk 400 has a spring rate SR which may be determined experimentally by measuring the deflection under a known load, as shown in FIG. 9a. One method for determining the spoke disk spring rate k is to mount the spoke disk to a hub, and attaching the outer ring of the spoke disk to a rigid test fixture. A downward force is applied to the hub, and the displacement of the hub is recorded. The spring rate k is determined from the slope of the force deflection curve as shown in FIG. 9b. It is preferred that the connected spoke disk spring rate be greater than the spring rate of the shear band. It is preferred that the connected spoke disk spring rate be in the range of 4 to 12 times greater than the spring rate of the shear band, and more preferably in the range of 6 to 10 times greater than the spring rate of the shear band. The spring rate of the non-pneumatic tire may be adjusted by increasing the number of circumferential vanes of the spoke disk. Alternatively, the spring rate of each spoke disk may be different by varying the geometry of the spoke disk or changing the material.

Spokes

Figure 2:
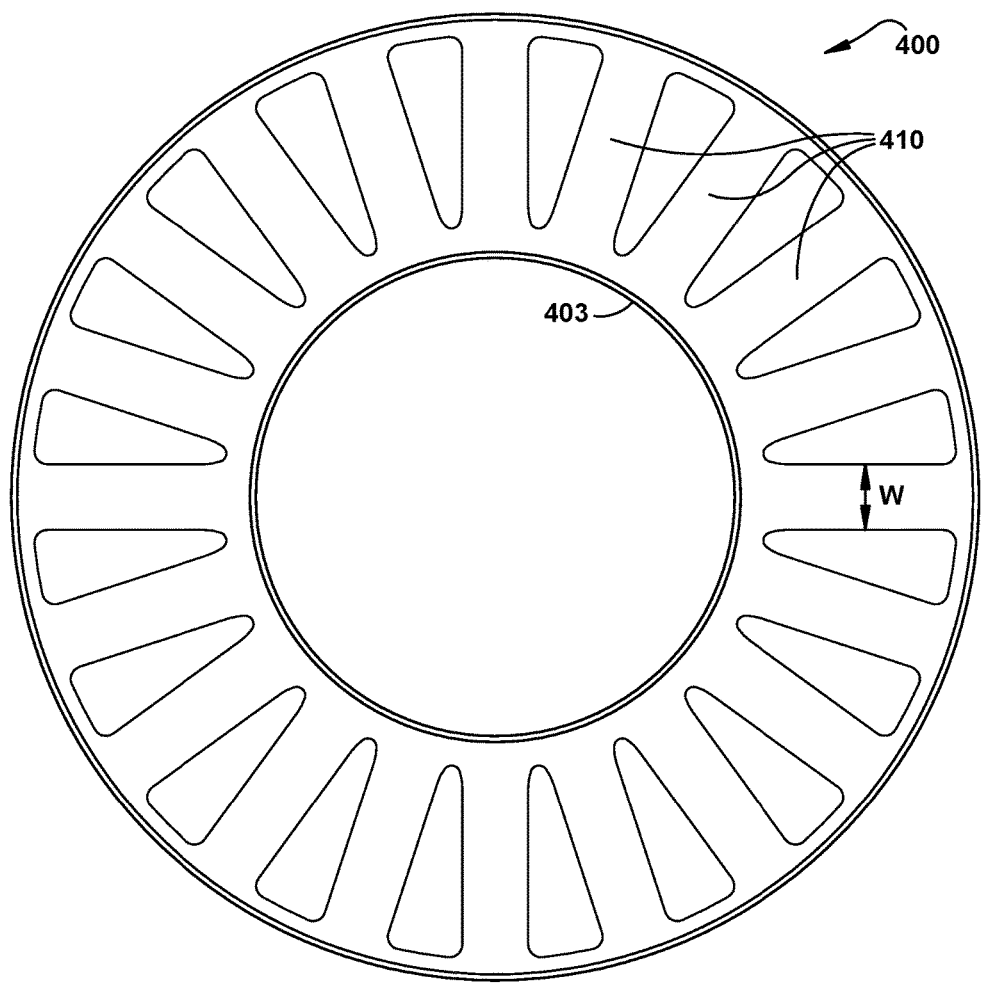
FIG. 2 is a front view of a spoke disk of the present invention.

As shown in FIG. 2, each circumferential spoke 412 has radial members 410 that extend in the radial direction.

Figure 5:
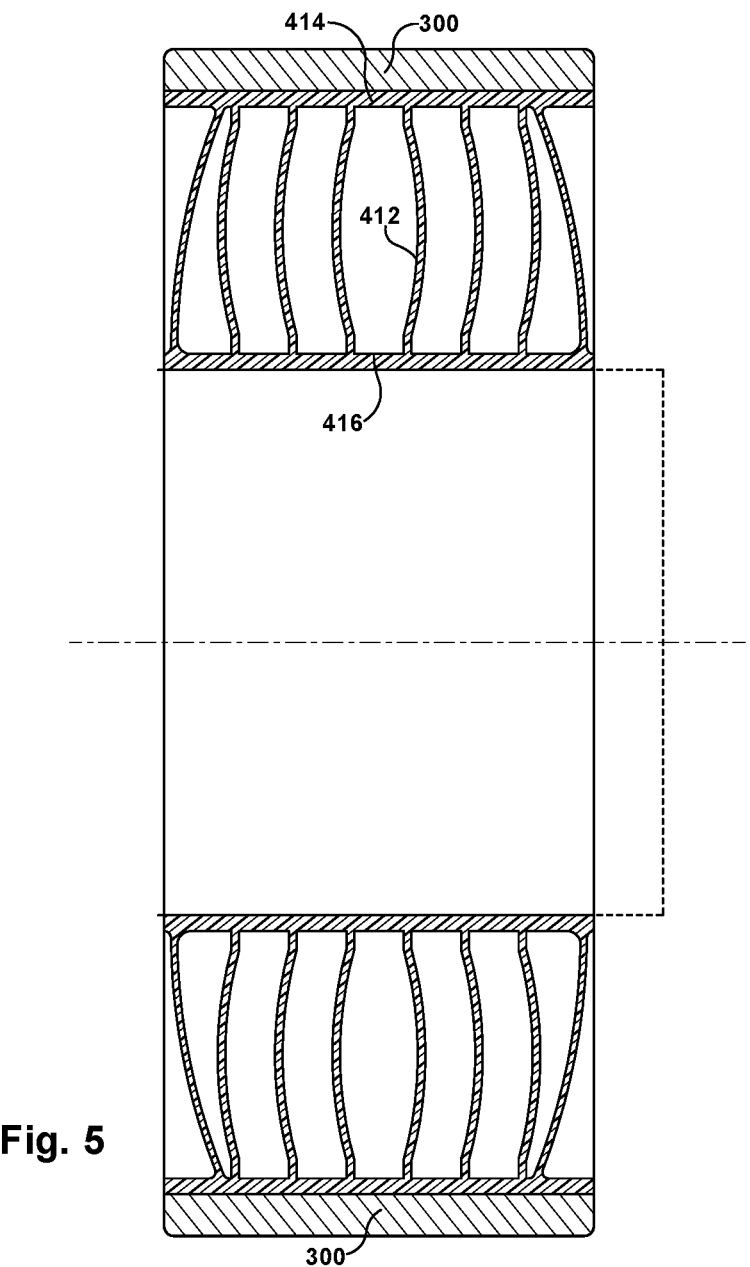
FIG. 5 is a cross-sectional view of the non-pneumatic tire of FIG. 1.
Figure 6:
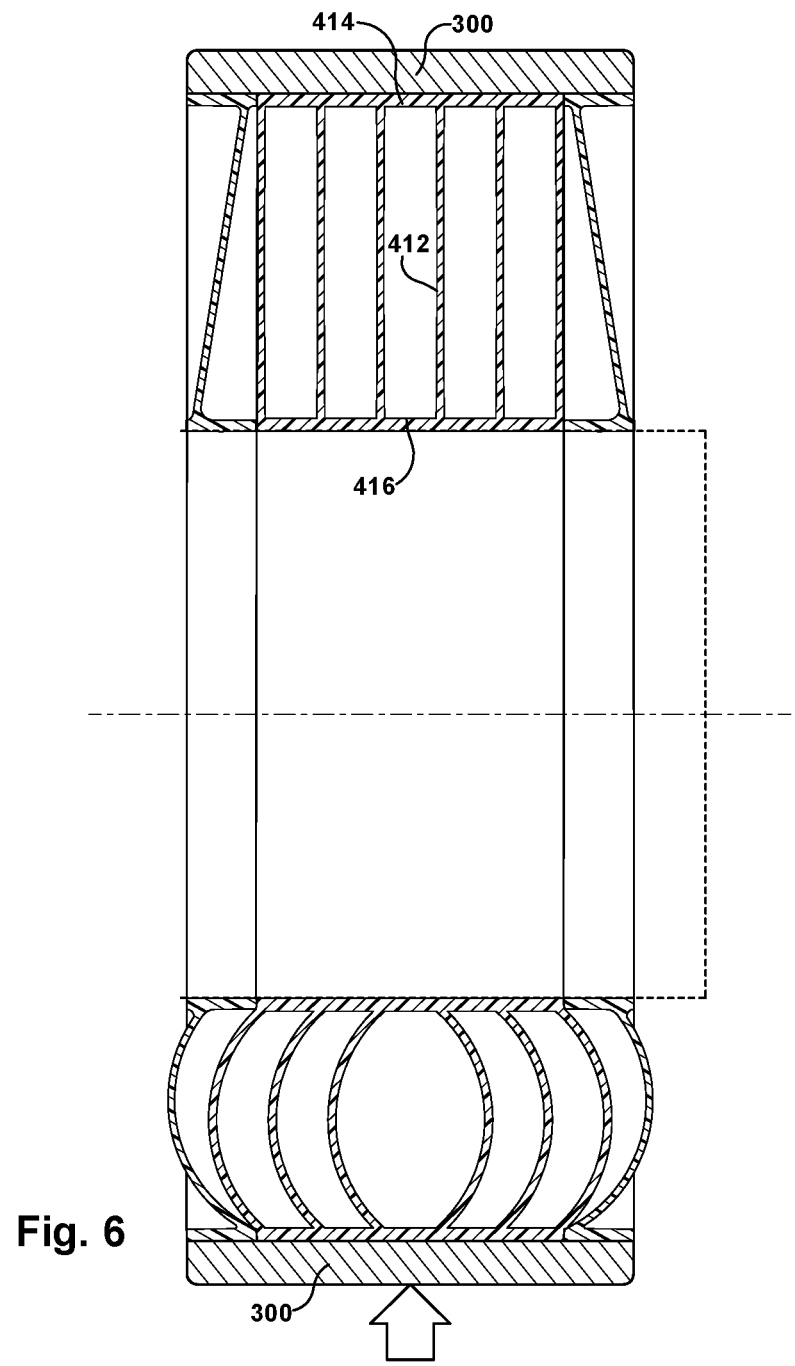
FIG. 6 is a cross-sectional view of the non-pneumatic tire of FIG. 1 shown under load.

Each circumferential spoke is designed to bulge or deform in an axial direction, so that each circumferential spoke deforms or bends axially, as shown in FIG. 5, when the non-pneumatic tire is under load. Each spoke disk may be oriented so that circumferential spokes on one side of the disk deform in a first direction, while spoke disks on the opposite side of the disk bulges or deforms in the opposite direction as shown in FIG. 6. Alternatively, all of the circumferential spokes may be oriented so that each circumferential spoke bulges axially outward in the same direction. When the non-pneumatic tire is loaded, each circumferential spoke will deform or axially bow when passing through the contact patch with substantially no compressive resistance, supplying zero or insignificant compressive force to load bearing. The predominant load of the connected spoke disk is through tension and shear, and not compression.

As shown in FIG. 2, the radial members 410 of each circumferential spoke have a rectangular cross section, but are not limited to a rectangular cross-section, and may be round, square, elliptical, etc. Preferably, the cross-sectional geometry of the radial member 410 is selected for longitudinal buckling, and preferably has a spoke width W to spoke axial thickness ratio, W/t, in the range of about 15 to about 80, and more preferably in the range of about 30 to about 60 and most preferably in the range of about 45 to about 55. A unique aspect of the preferred rectangular spoke design is the ability of the spokes to carry a shear load, which allows the spring stiffness to be spread between the spokes in tension and in shear loading. This geometric ability to provide shear stiffness is the ratio between the spoke thickness t and the radial height H of the spoke. The preferred ratio of H/t is in the range of about 2.5 and 25 (about means+/−10%) and more preferably in the range of about 10 to 20 (about means+/−10%), and most preferably in the range of 12-17.

The outer circumferential spokes 410 preferably are angled in the radial plane at an angle alpha as shown in FIG. 3. The angle alpha is preferably in the range of 60 to 88 degrees, and more preferably in the range of 70 to 85 degrees. Additionally, the radially outer end 415 is axially offset from the radially inner end 413 of spoke 410 to facilitate the spokes bowing or deforming in the axial direction. Alternatively, the spokes 412 may be curved as shown.

Figure 7:
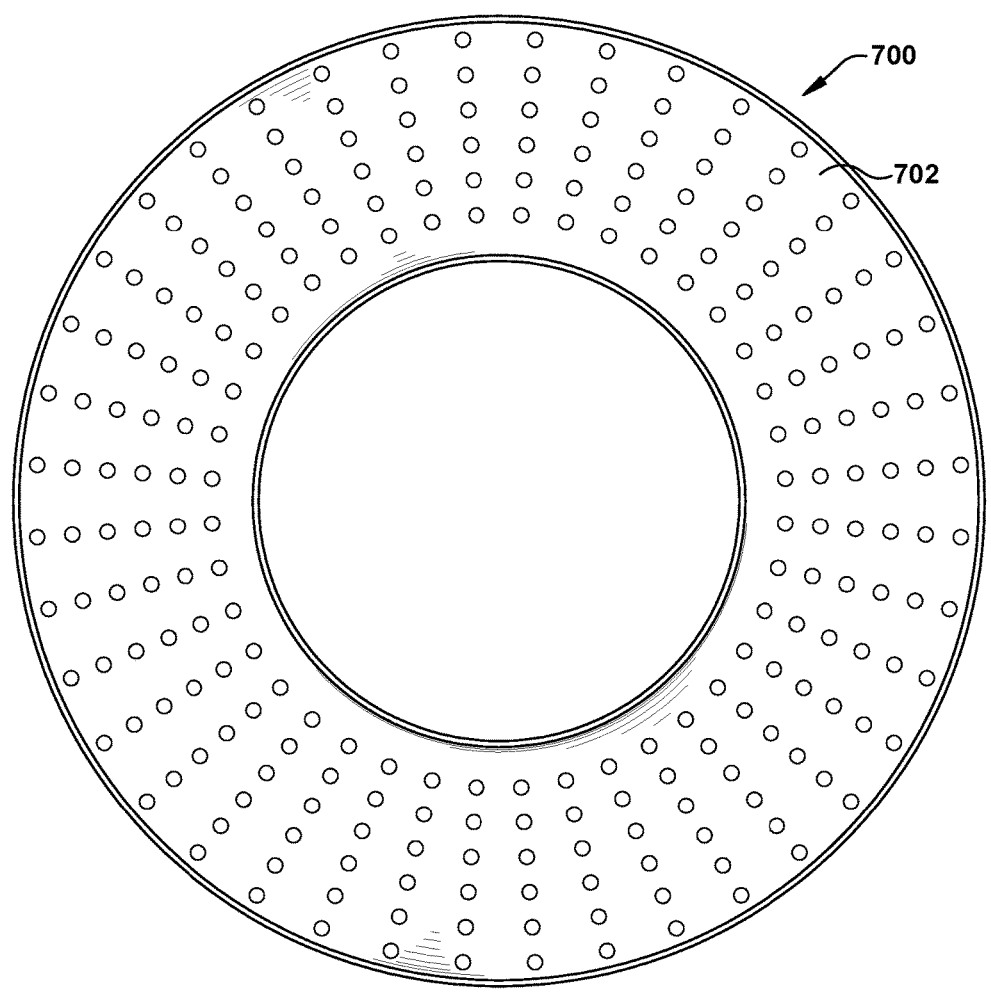
FIG. 7 is an alternate embodiment of a spoke of the present invention.

FIG. 7 is an alternate embodiment of connected spoke disk 700. The spoke disk is annular, and primarily solid with a plurality of holes 702. The holes may be arranged in rows oriented in a radial direction.

Figure 8:
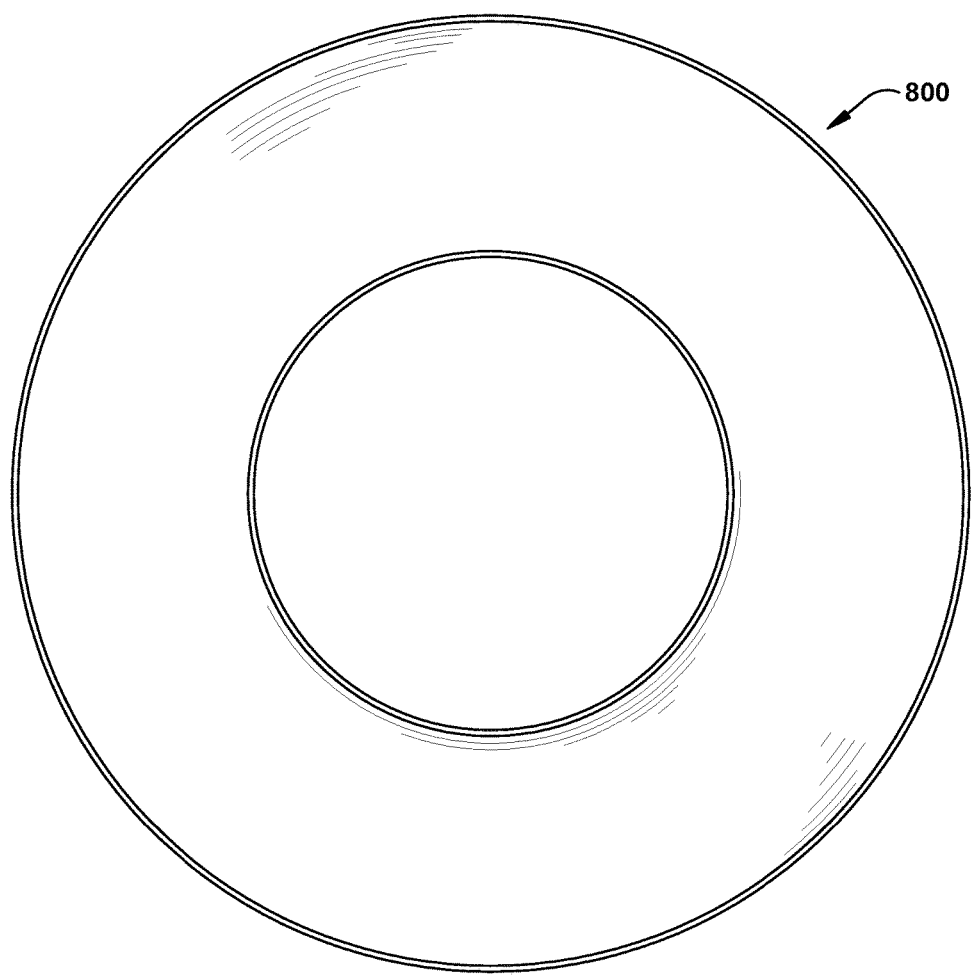
FIG. 8 is an alternate embodiment of a spoke of the present invention.
Figure 11A:
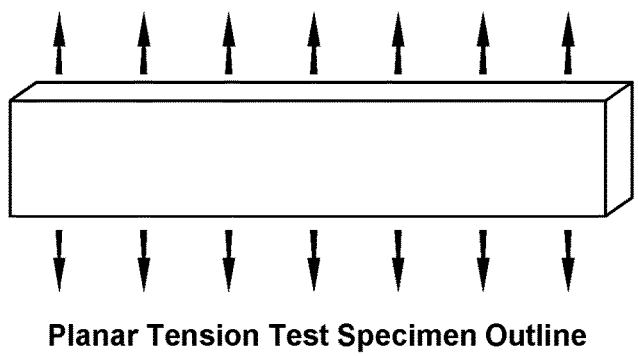
FIG. 11a illustrates the direction of tensile forces on a test specimen undergoing a tensile test.
Figure 11B:
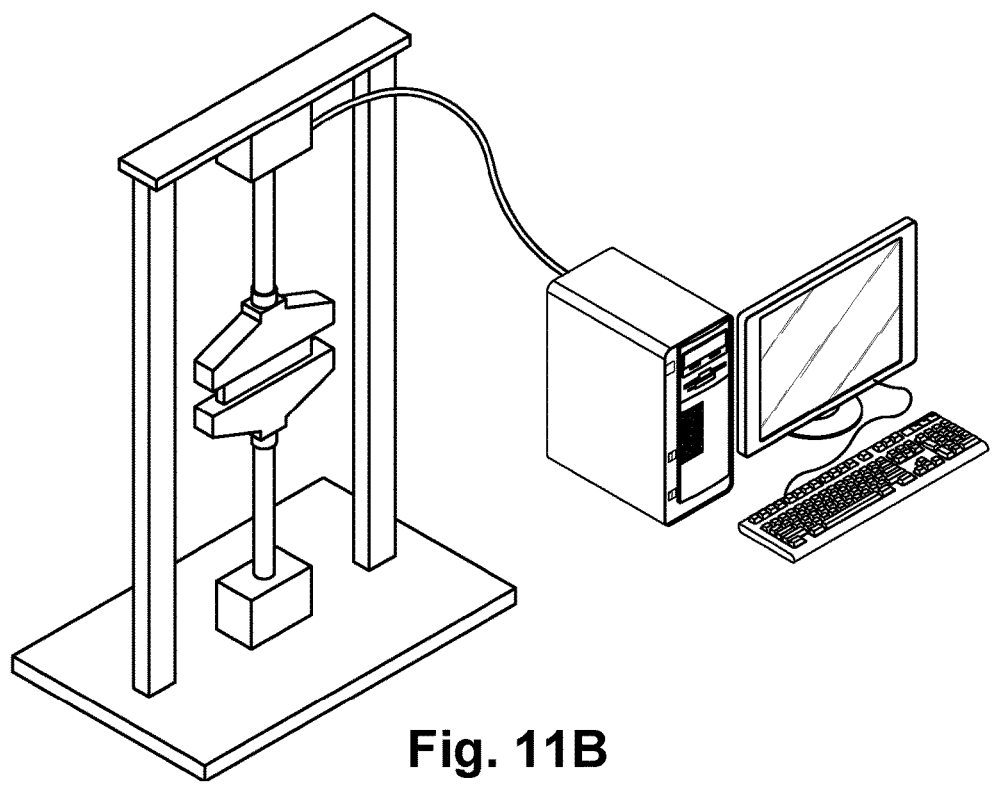
FIG. 11b is a schematic of a test specimen undergoing a tensile test.

FIG. 8 is an alternate embodiment of connected spoke disk 800. The connected spoke disk in annular and solid, with no holes. The cross-section of the connected spoke disk 700, 800 is the same as FIG. 3. The connected spoke disks 700, 800 have the same thickness, axial width as shown in FIG. 3.

The connected spoke disks are preferably formed of an elastic material, more preferably, a thermoplastic elastomer. The material of the connected spoke disks is selected based upon one or more of the following material properties. The tensile (Young's) modulus of the disk material is preferably in the range of 45 MPa to 650 MPa, and more preferably in the range of 85 MPa to 300 MPa, using the ISO 527-1/-2 standard test method. The glass transition temperature is less than −25 degree Celsius, and more preferably less than −35 degree Celsius. The yield strain at break is more than 30%, and more preferably more than 40%. The elongation at break is more than or equal to the yield strain, and more preferably, more than 200%. The heat deflection temperature is more than 40 degree C. under 0.45 MPa, and more preferably more than 50 degree C. under 0.45 MPa. No break result for the Izod and Charpy notched test at 23 degree C. using the ISO 179/ISO180 test method. Two suitable materials for the disk is commercially available by DSM Products and sold under the trade name ARNITEL PM 420 and ARNITEL P1461.

Applicants understand that many other variations are apparent to one of ordinary skill in the art from a reading of the above specification. These variations and other variations are within the spirit and scope of the present invention as defined by the following appended claims.

What is claimed:

1. A structurally supported non-pneumatic tire comprising:
    a ground contacting annular tread portion;
    a shear band; and
    a spoke disk connected to the shear band, wherein the spoke disk has two or more circumferential spokes joined together by an upper and lower connecting web, wherein each spoke has an axial thickness less than the axial thickness of the spoke disk, wherein the spring rate of the spoke disk is greater than the spring rate of the shear band.

2. The structurally supported non-pneumatic tire of claim 1 wherein the axial thickness of each spoke is less than the width of the spoke.

3. The structurally supported non-pneumatic tire of claim 1 wherein the circumferential spokes have the same spring constant.

4. The non-pneumatic tire of claim 1 wherein said circumferential spoke is a solid annular disk having no holes.

5. The non-pneumatic tire of claim 1 wherein said circumferential spoke is a solid annular disk having one or more holes.

6. The non-pneumatic tire of claim 5 wherein said circumferential spoke has a plurality of holes arranged in radially oriented rows.

7. The non-pneumatic tire of claim 1 wherein said circumferential spoke has a plurality of radially oriented spokes.

8. A structurally supported non-pneumatic tire comprising:
    a ground contacting annular tread portion;
    a shear band; and
    a spoke disk connected to the shear band, wherein the spoke disk has two or more circumferential spokes joined together by an upper and lower connecting web, wherein the spring rate of the spoke disk is greater than the spring rate of the shear band,
    wherein the spokes are angled at an angle ($\alpha$) with respect to the axial direction in the range of 60-80 degrees.

9. The non-pneumatic tire of claim 1 wherein a ratio (W/t) of a width (W) of each spoke to an axial thickness (t) is in the range 15 to 80.

10. The non-pneumatic tire of claim 1 wherein a (H/t) ratio of a height (H) of each spoke disk to an axial thickness (t) of each spoke disk is in the range of 2.5 to 25.

11. A structurally supported non-pneumatic tire comprising:
    a ground contacting annular tread portion;
    a shear band; and
    a spoke disk connected to the shear band, wherein the spoke disk has two or more circumferential spokes joined together by an upper and lower connecting web, wherein the spring rate of the spoke disk is greater than the spring rate of the shear band,
    wherein the spoke radially outer end is axially offset from the radially inner end of the spoke.

12. The non-pneumatic tire of claim 1 wherein the spoke is curved from the radially outer end to the radially inner end.

13. The non-pneumatic tire of claim 1 wherein the spokes bow under load in the axial direction.

14. The non-pneumatic tire of claim 1 wherein a spoke of the spoke disk has a rectangular cross-section.

15. The non-pneumatic tire of claim 1 wherein the spring rate of the spoke disk is in the range of 4 to 12 times greater than the spring rate of the shear band.

16. A non-pneumatic tire comprising:
    a ground contacting annular tread portion;
    a shear band; and
    at least one spoke disk connected to the shear band, wherein the spoke disk has two or more circumferential spokes joined together by an upper and lower annular connecting web, wherein each connecting web extends the full axial width of the non-pneumatic tire, wherein each circumferential spoke has a spoke width (W) and an axial thickness (t), wherein a ratio of the spoke width to axial thickness (W/t) is in the range between 15 and 80.

17. The non-pneumatic tire of claim 16 wherein at least one of said circumferential spokes has a rectangular cross-section.

18. The non-pneumatic tire of claim 16 wherein at least one of said circumferential spokes have a plurality of radial members that extend in the radial direction.

19. The non-pneumatic tire of claim 16 wherein the spring rate of the spoke disk is greater than the shear band spring rate.

20. The structurally supported non-pneumatic tire of claim 16 wherein the ratio of the spoke width to axial thickness (W/t) is in the range between 30 and 60.

21. The structurally supported non-pneumatic tire of claim 16 wherein the spring rate of the connected spoke disks is in the range of 4 to 12 times greater than the spring rate of the shear band.

22. The structurally supported non-pneumatic tire of claim 16 wherein the spokes are curved.

23. A structurally supported non-pneumatic tire comprising:
   a ground contacting annular tread portion;
   a shear band; and
   a spoke disk connected to the shear band, wherein the spoke disk has two or more circumferential spokes joined together by an upper and lower annular connecting web, wherein the upper and lower connecting web each extend the full axial width of the non-pneumatic tire, wherein the spring rate of the spoke disk is greater than the spring rate of the shear band.

\* \* \* \* \*